United States Patent
Johnson et al.

(10) Patent No.: US 7,551,783 B2
(45) Date of Patent: *Jun. 23, 2009

(54) METHODS, FUNCTIONAL DATA, AND SYSTEMS FOR IMAGE FEATURE TRANSLATION

(75) Inventors: Michael Johnson, Phoenix, AZ (US); Rida M. Hamza, Inver Grove Heights, MN (US); Au W. Kwong, Bloomington, MN (US); Thomas A. Henderson, Sammamish, WA (US)

(73) Assignee: Honeywell International Inc., Morristown, NJ (US)

( * ) Notice: Subject to any disclaimer, the term of this patent is extended or adjusted under 35 U.S.C. 154(b) by 55 days.

This patent is subject to a terminal disclaimer.

(21) Appl. No.: 11/807,742

(22) Filed: May 30, 2007

(65) Prior Publication Data

US 2007/0237397 A1 Oct. 11, 2007

Related U.S. Application Data

(63) Continuation of application No. 10/055,876, filed on Jan. 23, 2002, now Pat. No. 7,242,806.

(51) Int. Cl.
*G06K 9/62* (2006.01)
(52) U.S. Cl. .................. 382/209; 382/217; 382/218; 348/160
(58) Field of Classification Search ............ 382/209, 382/217, 218; 348/160
See application file for complete search history.

(56) References Cited

U.S. PATENT DOCUMENTS

| | | | |
|---|---|---|---|
| 3,115,495 A | 12/1963 | Tachikawa et al. | |
| 4,408,342 A | 10/1983 | Grabowski et al. | |
| 4,581,762 A | 4/1986 | Lapidus et al. | |
| 5,321,772 A | 6/1994 | Sawyer et al. | |
| 5,438,329 A | 8/1995 | Gastouniotis et al. | |
| 5,528,698 A | 6/1996 | Kamei et al. | |
| 5,673,331 A | 9/1997 | Lewis et al. | |

(Continued)

FOREIGN PATENT DOCUMENTS

DE 19545631 12/1995

(Continued)

OTHER PUBLICATIONS

Algeria, F C., et al., "Computer Vision Applied to the Automatic Calibration of Measuring Instruments", *Measurement, Institute of Measurement and Control*, London, GB, vol. 28, No. 3, Oct. 2000 XP 004216824 ISSN: 0263-2241,(2000),185-195.

(Continued)

*Primary Examiner*—John B Strege
(74) *Attorney, Agent, or Firm*—Kris T. Fredrick

(57) ABSTRACT

Methods, functional data, and systems are provided for image feature translation. An image is decomposed into sub images, each sub image having its features identified by feature attributes. The feature attributes are used to identify a particular feature within each sub image. The orientation of the particular feature within the sub image is then mapped or calculated to a value. One or more of the mapped or calculated values are translated into a reading associated with an instrument. The reading is then optionally recorded or transmitted.

20 Claims, 6 Drawing Sheets

U.S. PATENT DOCUMENTS

| | | | |
|---|---|---|---|
| 5,907,630 | A | 5/1999 | Naoi et al. |
| 6,006,226 | A | 12/1999 | Cullen et al. |
| 6,092,008 | A | 7/2000 | Bateman |
| 6,115,495 | A | 9/2000 | Tachikawa et al. |
| 6,181,815 | B1 | 1/2001 | Marugame |
| 6,181,820 | B1 | 1/2001 | Tachikawa et al. |
| 6,208,758 | B1 | 3/2001 | Ono et al. |
| 6,721,640 | B2 | 4/2004 | Glenn et al. |
| 6,845,177 | B2 | 1/2005 | Chiu |
| 6,915,190 | B2 | 7/2005 | Galasso |
| 7,242,806 | B2 * | 7/2007 | Johnson et al. ............. 382/209 |

FOREIGN PATENT DOCUMENTS

| | | |
|---|---|---|
| WO | WO-98/23519 | 6/1998 |

OTHER PUBLICATIONS

Batagelj, V , et al., "Automation of Reading Liquid-in-glass Thermometers", *17th IEEE Instrumentation and Measurement Technology Conference*, Baltimore, MD, USA, May 1-4, 2000, vol. 50, No. 6 XP 001151999 ISSN: 0018-9456,(2000),1594-1598.

Castleman, K. , "Digital Image Processing", *Perceptive Scientific Instruments*, (1996).

Russ, J. , *The Image Processing Handbook*, (1999).

Sablatnig, R , et al., "Application Constraints in the Design of an Automatic Reading Device for Analog Display Instruments", *Application of Compute Vision*, 1994., Proceedings of the Second IEEE Workshop on Sarasota, FL, USA Dec. 5-7, 1994, Losa Alamitos, CA, USA, IEEE Comput. Soc, Dec. 5, 1994, XP010100102 ISBN: 0-8186-6410-X, (1994),205-212.

Sablatnig, R , et al., "Automatic Reading of Analog Display Instruments", *Pattern Recognition*, 1994. vol. 1—Conference A: Computer Vision & Image Processing., Proceedings of the 12th IAPR International Conference on Jerusalem, Israel Oct. 9-13, 1994, Los Alamitos, CA, USA IEEE Comput. Soc, Oct. 9, 1994, XP010216136 ISBN: 0-8186-6265-4,(1994),794-797.

* cited by examiner

METHODS, FUNCTIONAL DATA, AND SYSTEMS FOR IMAGE FEATURE TRANSLATION

RELATED APPLICATIONS

This application is a continuation of U.S. patent application Ser. No. 10/055,876, filed Jan. 23, 2002, now U.S. Pat. No. 7,242,806 which application is incorporated herein by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 2001, Honeywell Inc., All Rights Reserved.

FIELD OF THE INVENTION

The present invention relates to image feature translation, and in particular to methods, functional data, and systems used to extract features from an image and translate those features into information.

BACKGROUND OF THE INVENTION

Many non-modernized aircrafts lack the ability to capture, in a computer readable medium, information related to cockpit instrumentation. As a result, the notorious "black box" is non-existent in many of these aircraft. Accordingly, these aircraft remain exempt from existing federal regulations that require the capture of instrument readings during flight.

Many of the instruments, within the cockpit, need to be read in combination with one or more needles and or gauges. Pilots are forced to process an accurate instrument reading by viewing the several needles and gauges together at any particular moment in time and then process the instrument reading. Correspondingly, the present technique used to rapidly determine an instrument reading is subject to human error.

Although, modern aircraft and large commercial aircraft have computerized the readings of instrumentation, which are recorded on a black box, there are no backup processes or cross checks in the event of computerized failure, or in the event the pilot's display panel fails. Therefore, a single point of failure in capturing instrument readings results in a need for adequate backup in the event of failure.

Moreover, many existing devices lack the ability to provide instrument readings in a computer readable format. Often, these devices cannot practically be retrofitted to include processing and storage capabilities. The expense and labor associated with installing new instruments to provide such functionality can make the new instrument upgrade more expensive than buying a new device altogether. As a result, many existing devices continue to lack the appropriate automation, which can improve the use, performance, and analysis of the devices. Furthermore, once any device is upgraded then the information collected can be used and shared with other automated devices.

Yet, current image feature extraction techniques do not provide performance and translation abilities which permit rapid and efficient image capture and image processing in order to generate instrument readings from a captured image in a useful and meaningful way to a user or a control system associated with the device. By and large, current image feature extraction relates to standard optical character recognition (OCR), or the detecting and the indexing of sub images within an image for purposes of search and retrieval techniques. OCR is not helpful when reading an instrument that includes needles or other gauges, this situation requires an analysis of an orientation of the multiple visual features within a captured sub image of the instrument in order to adequately generate an instrument reading.

OCR is primarily helpful in character recognition; it will not assist with feature recognition within a captured sub image, such as detecting a needle and a needle's orientation within the sub image. Furthermore, image feature extraction does not assist with translating various features extracted into meaningful information or instrument readings, since these extractions are primarily focused on permitting better search and retrieval capabilities associated with image data. Therefore, there exists a need for methods, functional data, and systems that addresses these shortcomings, and provide increased monitoring associated with reading instruments.

SUMMARY OF THE INVENTION

An image processor performs image feature extraction and translation. The image processor separates sub images from an image and associates each sub image with a template. The image processor locates one or more features within a sub image based on feature vectors. In one embodiment, vehicle instrumentation images are processed to digitize readings from the instrumentation.

In another embodiment of the present invention functional data residing on a computer readable medium is provided to translate image data. The functional data include image data including one or more instrument images and rules data uniquely associated with one or more of the instrument images. Further, processing instruction data are provided and operable to isolate each instrument image and use the rules data to detect one or more reading indicators within each instrument image. Moreover, the processing instruction data are operable to translate one or more of the reading indicators into an instrument reading represented by the image data.

In still another embodiment a system for capturing and processing images, comprises a camera to capture an image, a template uniquely associated with a sub image of the image, and a feature vector defining a feature within the sub image. Furthermore the system includes a processing set of executable instructions operable to extract a location of the feature within the sub image by using the template and the feature vector.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Software for the system is stored on one or more computer readable media. In one embodiment the software is stored on secondary storage, such as a disk drive and loaded into main memory and cache of the computer as needed. The software is written in the form of executable instructions that generally provide a single function or subsets of related functions. However, in various embodiments, the software comprises a single module or many modules, and there is no requirement that functions be grouped together. Hardware and/or firmware are used to implement the invention in further embodiments. The software may implement the functions, or simply facilitate the performance of the function by a human by providing menu driven interfaces, or other means of providing information to the system.

Image capturing devices, in some embodiments, include cameras to detect and record image data. Any camera capable of detecting and recording image data is intended to fall within the scope of the present invention, including standard digital cameras, x-ray cameras, scanning cameras, infrared (IR) cameras, photocopiers, photoprinters, and the like. The camera is used to trap an image in a computer readable medium.

Figure 1:
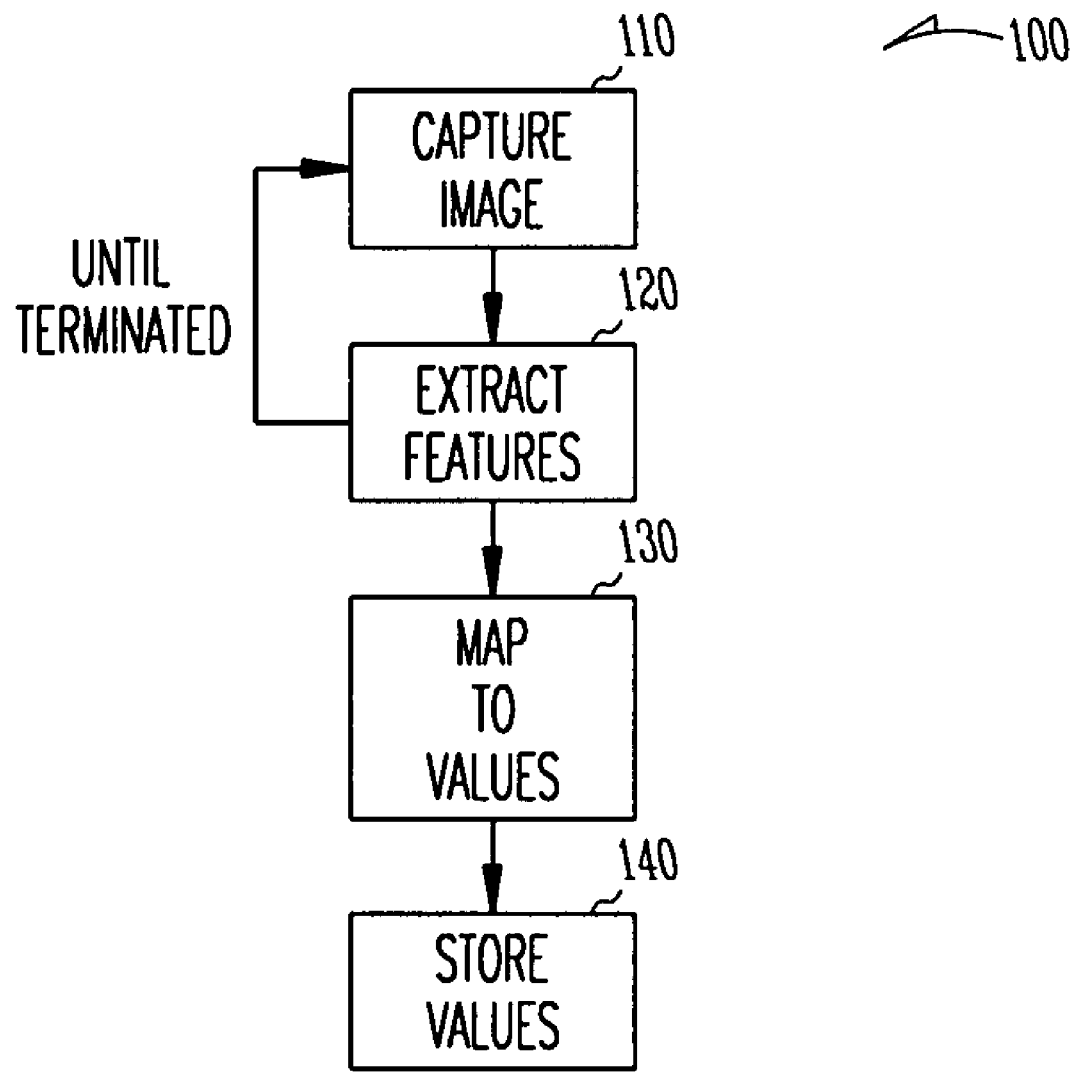
FIG. 1 is a flowchart representing a method of processing an image.

FIG. 1 shows one method 100 for processing an image according to the present invention. Initially, an image is captured in step 110 by a camera or a plurality of cameras. In some embodiments, the camera records an electronic image of an instrument panel. The panel includes one or more mechanical, electric, or electromechanical instruments used to monitor the performance of one or more devices. For example, in a cockpit of an older airplane a single camera or a plurality of cameras is directed to take electronic photographs of the instrument panel in the cockpit. The mechanical or electromechanical instruments include air speed indicator, vertical speed indicator, horizontal situation indicator, altimeter, and others.

In some embodiments, a single electronic photograph records all the instruments within the cockpit in a single image or streams of images, or multiple cameras are used to record multiple electronic images representing subsets of the instruments. Alternatively in other embodiments, multiple cameras concurrently take a single electronic image of all the instruments, with an image selection set of executable instructions used to select the best quality image to use for subsequent processing.

In some embodiments, the cameras are interfaced either via a hardwired connection or via a wireless connection so that the image or the images are received by one or more processing elements having one or more sets of executable instructions operable to further process the images. As one skilled in the art will readily appreciate, interfacing a camera or a plurality of cameras to processing elements is easily achieved with well-known techniques. For example, in some embodiments a universal serial bus (USB) connection is made from the camera to a processing element where standard device driver sets of executable instructions for the camera, within the processing element, permit communication between the camera and the processing element over the USB connection. In the present example, the camera may be stabilized and properly encased within the cockpit at a location, which permits the camera to get a clear unobstructed image of the instrument panel and remain fixed on the instrument panel even during turbulence.

As one skilled in the art will appreciate, image registration techniques may be added to account for camera positioning and alignment with a reference in situations where the camera is not completely stabilized.

Upon initial set up of the camera or cameras, in some embodiments, a computer device with a display is used to interface with the processing element to control the initial calibration of the camera or cameras. A graphical user interface (GUI) set of executable instructions is then provided to the user where the user identifies one or more specific instruments within the camera's viewing area and further identifies at least three coordinate points within the sub image. The three coordinate points identify an orientation of the sub image's center or origin point, an eastwardly edged point of the sub image along an x-axis, and a northwardly edged point of the sub image along the y-axis point. Of course, more than three points in other embodiments are used. Further, the presentation of the points need not be as x-axis points and y-axis points, since in some embodiments the points are presented to a user in user understandable fashion by the GUI set of executable instructions, such as with our present example as north, east, west, or south points.

Once a user identifies the three points during initial calibration of the camera, standard geometric calculations are made to determine the degree of error or angular orientation associated with initial calibration. As one skilled in the art will appreciate, the camera may not be initially fixed directly on the various instruments, and as a result the perspective view of the camera may not give a true reading of any needle or gauges associated with the instruments. Further, the surface plane of the camera lens may not be entirely parallel to the surface plane associated with the face of the instruments, and as a result, for example, the image taken by the camera, in some embodiments, is an ellipse and not a true circle.

The approach that follows below is an approximation to one embodiment that applies registration techniques by computing an actual spatial transformation between the sub image and a template associated with the sub image. Of course as one skilled in the art will readily recognize other registration techniques can also be applied without departing from the present invention.

For example, the degree of angular orientation associated with the perspective angle of the camera with respect to a horizontal situation indicator is calculated by having a user on initial set up use a GUI set of executable instructions where the user identifies three coordinate points of $(C_x, C_y)$, $(E_x, E_y)$ and $(N_x, N_y)$. The distance from the Center (e.g., $C_x, C_y$) to the highest value on the x-axis (e.g., in an eastwardly direction $E_x$) is readily calculated by acquiring the distance dx from $dx=(E_x-C_x)$. Next, the distance dy from the center to the highest value on the y axis in an eastwardly direction $E_y$ from Center is calculated by $dy=(E_y-C_y)$. A degree of angular orientation $\Phi$ is then solved by the following equation:

$$\Phi = \tan^{-1}\left(\frac{dy}{dx}\right).$$

In this way once calibrated, the degree of angular orientation Φ associated with the camera's perspective view of the horizontal situation indicator is readily processed by the processing element of the user's computing device interfaced to the processing element on initial set up and performing a calculation similar to the one detailed above.

In a similar way, the shape of the ellipse related to the distortion associated with a planer face of the lens to a planer surface of the horizontal situation indicator is also readily calculated. For example, a first radius A of ellipse E is solved by the following equation:

$$A = \sqrt{(dx^2 + dy^2)}.$$

The second radius of E is solved by the following equation:

$$B = \sqrt{((N_x - C_x)^2 + (N_y - C_y)^2)}.$$

In the present example once E and Φ are known, the camera is calibrated to the horizontal situation indicator and manipulated by extracting one or more locations of any needles and any gauges from the image, with the locations adjusted to account for the angular orientation and scaling of any needles/gauges with respect to E's coordinates. Moreover, only the locations within the image for the needles and gauges need retain, the sub images representing the needles or gauges do not need to be retained, correspondingly significant memory and/or storage is saved with the present invention, and processing is simplified.

In step 120, features are extracted or identified within the image or sub image that is being processed. As one skilled in the art will appreciate, the features need not be extracted from the image of the instrument, all that is required is that the location and orientation of the features within the image be identified. Once a precise location of a feature is identified, then the orientation of the feature is calculated using the initial calibration coordinate points and the calculated angular orientation to determine one or more raw values associated with the feature.

Features, in some embodiments, include additional sub images within an image or another sub image and are indicative of specific needles, gauges, alpha characters, symbol characters, numeric characters, and others. As one skilled in the art will appreciate, desired or targeted additional sub images within an image/sub image are often referred to as regions of interest within the image. Correspondingly, as used herein, sub images include regions of interest within the image. Moreover, in some embodiments, needles, gauges and other desired sub images are referred to as graphical symbols. Further, as used herein, the terms "features" and "graphical symbols" are used interchangeably.

Once a first sub image (e.g., horizontal situation indicator) is calibrated and identified, the graphical symbols within the sub image are identified by a template associated with the sub image. The templates, in some embodiments, include attributes and rules, which are used by executable sets of instructions to perform actions. For example, an altimeter sub image within an overall image of a cockpit instrument panel includes three needles (e.g., graphical symbols or features), and the needles are read together to give a single instrument reading for the altimeter.

Correspondingly, a data template associated with the altimeter sub image includes, in some embodiments, three needle identifications (e.g., regions of interest), each region of interest can include, in some embodiments, a scaling attribute, a shift attribute, shape attributes, color attributes, gradient attributes, pattern attributes, texture attributes, and the like. The scaling attribute indicates that values associated with reading the graphical symbols at any particular moment in time. For example, a single scaling value associated with reading any particular graphical symbol (e.g., needle) is assigned in the template as a scaling attribute, so that given any identified orientation of the graphical symbol, within the region of interest, a calculated raw value (e.g., identifying a reading for the graphical symbol) is readily obtained by multiplying the scaling attribute against the identified graphical symbol's orientation. Any negative values are accounted for with shift values. For example, some instruments include negative values and have ranges of raw values associated with readings. A simple additional numeric shift value readily resolves the calculated raw value to conform to the instrument's proper range of raw values.

Furthermore in other embodiments, some numeric data, other than numeric data associated with instrument raw values, within some regions of interest (e.g., an altimeter instrument) are identifiable as OCR-enabled regions. In these embodiments, any OCR-type attribute such as a flag can be provided within the template indicating that an OCR function or set of executable instructions should be activated. For example, a specific region housing a pixel field, within the sub image (e.g., instrument or region of interest), where numeric data is available for OCR-type operations is readily defined within the template, such that the pixel field area is associated with the OCR attribute for any relevant graphical symbol/feature being defined by the template. And, OCR is performed on the pixel field area to convert the pixel data into raw values for that particular feature/graphical symbol that is associated with OCR operations.

In some embodiments, other attributes of the graphical symbols are identified in the template by their pixel shape and/or coverage area within the sub image (e.g., region of interest). This information may be represented in a table, which is embedded or referenced from the template. Of course as one skilled in the art will appreciate, any data structure can be used to represent attributal information of the template, which is associated with a sub image (e.g., region of interest or graphical symbol). Once a specific graphical symbol's shape or coverage area (e.g., total number of pixels, coverage of pixels along an x-axis, coverage along a y-axis, and the like) is defined, then a feature vector for the graphical symbol is generated and used to numerically assign a score to the graphical symbol's shape and/or coverage area attributes. Development of vectors for purposes of search and retrieval is well known to those skilled in the art, and any vector will suffice for the present invention.

In other embodiments, the feature vector is represented by multiple pixel coordinate points along the x-axis and y-axis of the feature. The sum of these coordinate points provides a comparison vector. In this way the graphical symbol's location, within the sub image (e.g., region of interest), is searched for by beginning at the calibrated origin, and successively acquiring three coordinate points identified by the feature vector for the graphical symbol. Searching continues around the calibrated origin in increments of 1 angular degree. Of course as one skilled in the art will appreciate, the searching can continue around the calibrated origin in any configured increments of angular degrees without departing from the present invention.

A running score maintains the highest value (e.g., best value based on the feature vector) for the multiple coordinate points when compared to the feature vector. Upon conclusion, the highest value is mapped (step 130) in a feature (e.g., graphical symbol) lookup table to a feature (e.g., graphical symbol) value (e.g., raw value). As previously presented, mapping can also include a simple calculation of the identified orientation associated with the highest value, wherein the identified orientation is multiplied against to the scaling and shift attributes. In these embodiments no feature lookup table is required. After feature or instrument values (e.g., raw values) are obtained for each necessary feature (e.g., graphical symbol) within a region of interest a corresponding instrument reading is generated. Accordingly, one or more instrument values are processed to generate an instrument reading. As one skilled in the art will appreciate, the two dimensional feature (e.g. graphical symbol image) is mapped to a single dimension and a raw value acquired using simple calculations, this provides efficiency and added processing throughput. Furthermore, as is apparent at no time is there a need to retain the features (e.g., graphical symbols) themselves, since the template and the processing defined above do not require this additional and unnecessary storage.

As one skilled in the art will appreciate, the above defined feature (e.g., graphical symbol) identification and mapping provides tremendous processing throughput on one or more processing elements. However, any feature extraction or identification can be used without departing from the present invention. For example in some embodiments, standard numerical analysis algorithms (e.g., neural network applications using mathematical backward propagation techniques, non-linear least squares techniques, and other techniques, to derive a formula) are trained on various sub images with the features (e.g., graphical symbols) in various locations within the sub image (e.g., region of interest). Further, the numerical analysis algorithms are provided the accurate instrument value (e.g., raw value) for each feature (e.g., graphical symbol), and the accurate instrument reading for each sub image (e.g., region of interest) of the instrument. Armed with this information, the numerical analysis algorithm generates a formula, so that when a new unknown pixel sub image (e.g., region of interest) is provided to the formula, a specific instrument reading is the generated output associated with the formula.

Once the pixel attributes are identified and/or extracted (e.g., selectively defined since pixels need not be physically extracted or stored with the present invention) within the template, then an instrument reading can be generated with the individual instrument values (e.g., raw values) and the overall instrument reading stored and/or communicated in step 140. In this way, an instrument panel image (e.g., image having multiple sub images or regions of interest) is electronically translated or otherwise mapped from image data to a more useable format within the computer readable medium, such as text data embodiment in a variety of underlying representations such as hexadecimal, and others. This permits, the values and readings to be used in other applications providing useful reports, real-time transmission, quality checking, error cross checking, or triggering secondary applications to control the device (e.g., airplane electromechanical equipment in the present example) to which the instrument values and readings relate.

Figure 2:
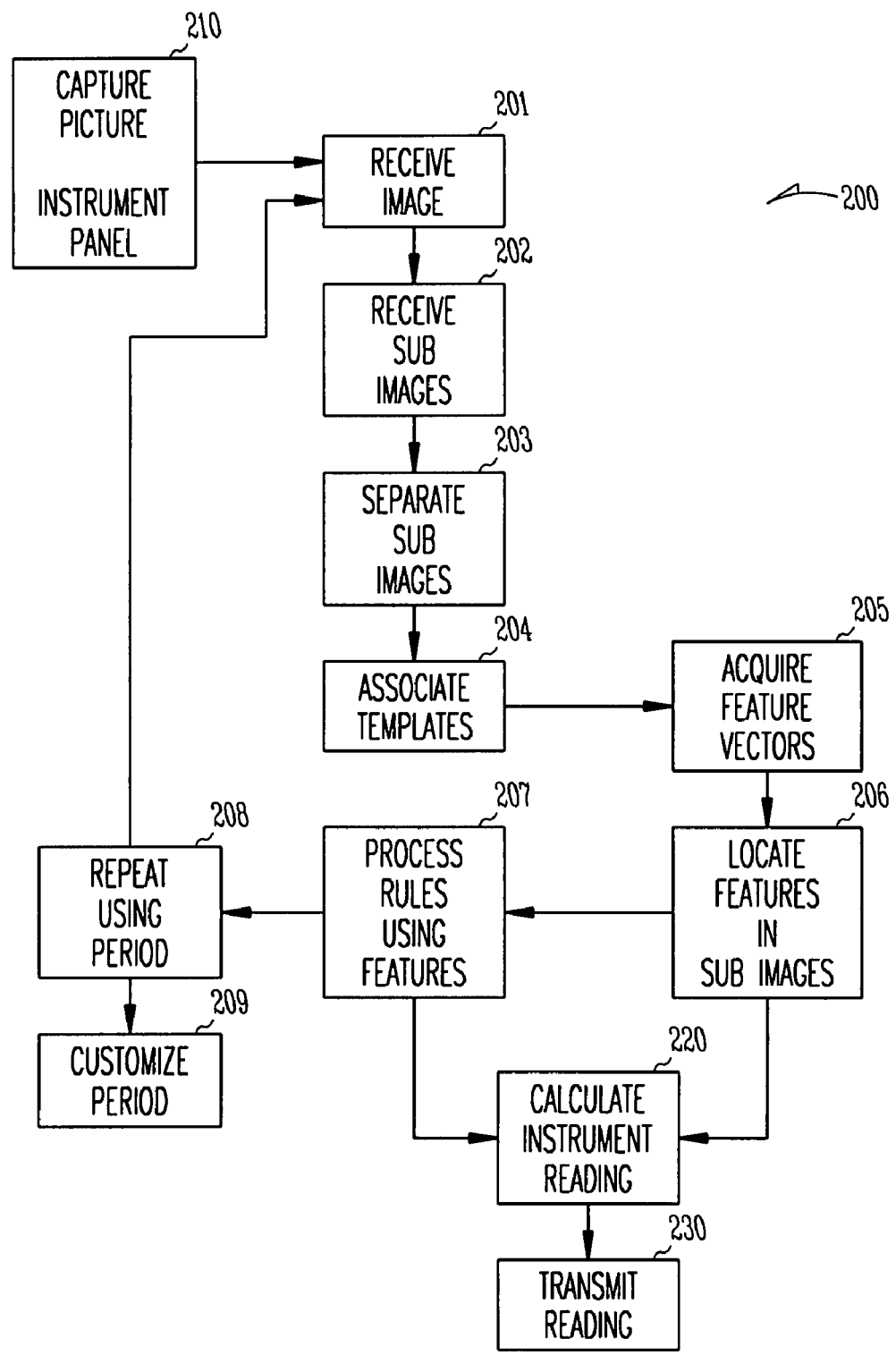
FIG. 2 is a flowchart representing a method of processing and translating an image.

FIG. 2 shows one method 200 to process and translate an image according to the teachings of the present invention. Initially, an image is received in step 201. In some embodiments, the image is an electronic picture of an instrument panel as identified in step 210. The instrument panel itself may relate to one or more instruments providing readings related to one or more devices. For example, in some embodiments the instrument panel is the panel of a motor vehicle having sub images of the vehicle's instruments providing readings for the rate of speed, odometer, gas gauge, temperature gauge, and others. Each instrument is associated with one or more devices within the vehicle. For example, the temperature gauge relates to devices within the car that increase or decrease the temperature of the vehicle's engine. Moreover, in some embodiments an initial calibration is performed on each of the instruments.

In step 202, sub images are received. The sub images, in some embodiments, are predefined as pixel regions of interest within the image. This permits rapid separation of the sub images in step 203. Of course, any logical or physical separation of the areas within the image to separate the relevant sub image is intended to fall within the scope of the present invention. In step 204, a template is associated with each sub image. In other embodiments, the template itself identifies the regions of interest within the image, thereby assisting in acquiring the sub image. As previously presented, each sub image includes one or more features (e.g., graphical symbols), which identify mechanical, or electromechanical needles or values within the sub image. These features are each associated with a feature vector, and the relevant feature vector acquired in step 205 for each feature.

Next, the sub image is processed to locate the features within the sub image in step 206. As previously presented a variety of techniques are deployed to identify the features, such as scanning from a calibrated origin in a 360 degree angular direction beginning with 0 degrees and proceeding in 1 degree increments until reaching the 360 degree mark. Of course if the orientation of the feature, which is trying to be identified, is not a needle or a gauge, such scanning is not necessary. Further, in some instances where the feature is a set of pixels associated with numeric, symbol, or character data, an OCR function or set of executable instructions can be executed on the region of interest defined in the template for that particular feature.

Further in some embodiments, one or more rules associated with the features are included within the template and processed by the appropriate set of executable instructions in step 207. As one skilled in the art will appreciate, this permits manipulation on each defined feature or value associated with each feature. In this way, computations and/or calculations on each feature, or derived feature value, are performed.

In step 208, each feature within the sub image is processed over a temporal period. In some embodiments, the period can be customized (e.g., step 209) or configured upon initial set up and/or calibration and is further represented as an elapsed time, a calendar date, or a time of day. In other embodiments the period is triggered by changes in the features automatically detected as images are acquired. In still other embodiments, events or changes in the state of a processing set of executable instructions trigger the capturing or receiving of additional images.

Once all the features are extracted, defined, or identified, and their orientations resolved as appropriate, raw values associated with each feature are acquired by mapping or otherwise calculating the feature orientation within a table (or any data structure(s)) or otherwise translating the features to values (e.g., using scaling and shift attributes, or using an OCR set of executable instructions) to a raw value. In step 220, the values can be combined to calculate an instrument reading for one or more of the instruments. In some embodiments, multiple features within a single sub image (e.g., region of interest) comprise the instrument reading. In other embodiments, multiple values or readings for multiple sub images combine to form a single instrument reading.

The reading is transmitted in step 230, to one or more computer readable media. Transmission, in some embodiments, occurs via a hardwired connection, a telephone connection, a satellite connection, a radio frequency connection, an infrared connection, and the like. Further in other embodiments, the transmission occurs over one or more different connections. Once transmission is complete, additional processing sets of executable instructions use the readings and the values associated with the features for a variety of applications including reporting and controlling devices to which the instruments relate. Moreover in other embodiments, the readings and values are warehoused in a data store, which is later operable to be mined and provide historical trends and relationships.

Figure 3:
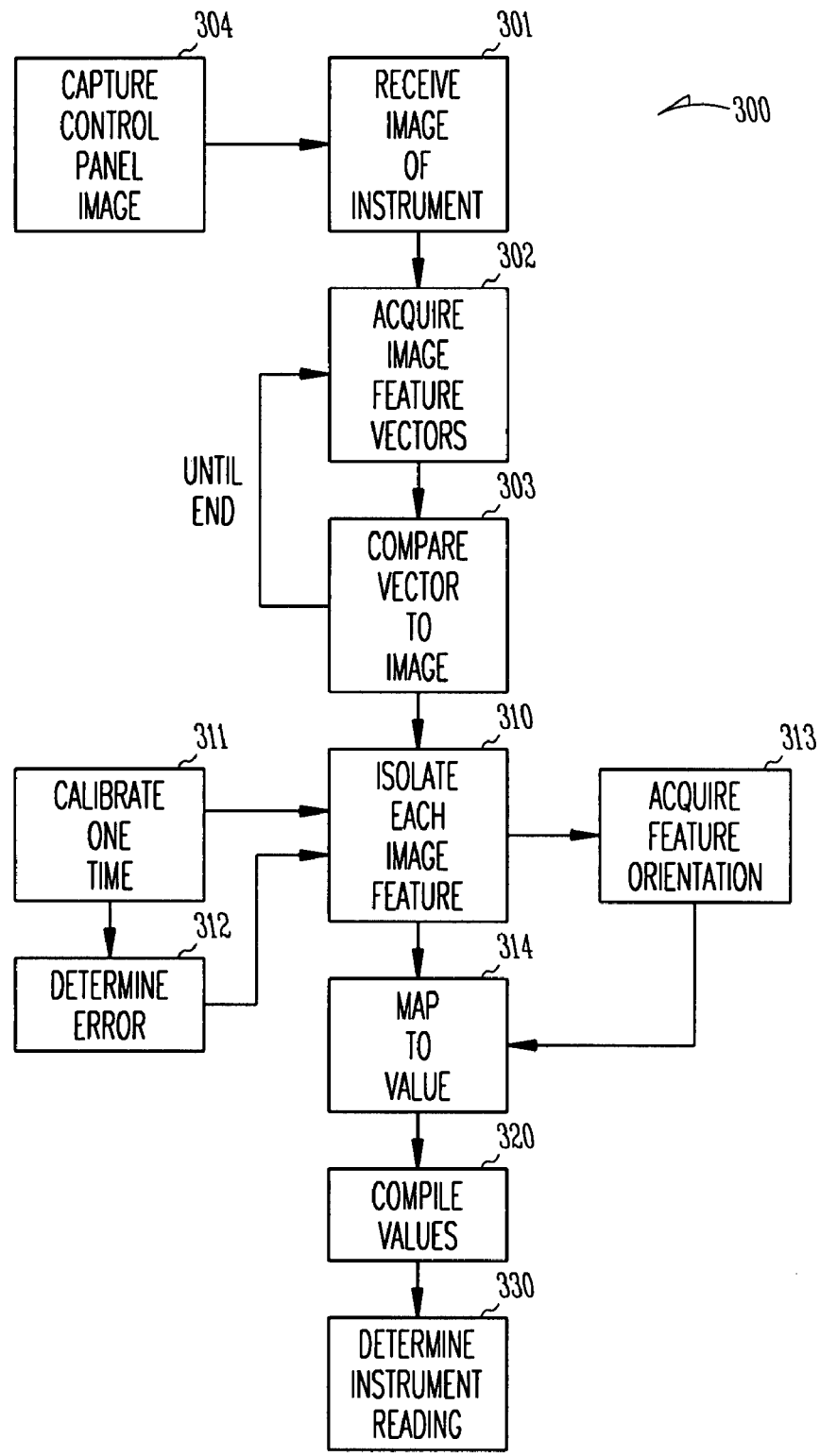
FIG. 3 is a flowchart representing another method of processing and translating an image.

FIG. 3 shows one embodiment of another method 300 for processing and translating an image. Again, in step 301 an electronic image of an instrument is received, and the image, in some embodiments is an electronic picture of a control panel, is captured in step 304. Further, the image includes one or more image features (e.g., graphical symbols) that are necessary to resolve an instrument reading. The features can include sub images of needles, gauges, numeric data, symbolic data, and character data.

Each image feature is isolated by acquiring an image feature vector (step 302), which is used to identify and isolate the location and/or orientation of the feature within the image. In step 303, each feature vector is compared against the image in step 303, until each image feature is isolated in step 310 within the image. As previously presented in some embodiments the feature is identified or isolated by acquiring the feature's orientation within the image as depicted in step 313. Each isolated feature is then mapped or translated (e.g., calculated) to its own raw value in step 314. The individual raw values are then compiled in step 320 to determine an overall instrument reading by performing, in some embodiments, one or more calculations in step 330.

In other embodiments, each image feature is calibrated at startup (e.g., one time) in step 311, to determine a degree of angular orientation associated with the receipt of the initial image in step 312. As previously presented and in some embodiments, calibration and angular orientation detection are achieved by having an initial installer of an image-capturing device identify three coordinates within the image. These coordinates are then mathematically manipulated, by calculations well known to those skilled in the art, to resolve a degree of angular orientation associated with an ellipse representing a circular distortion (e.g., as presented above).

Figure 4:
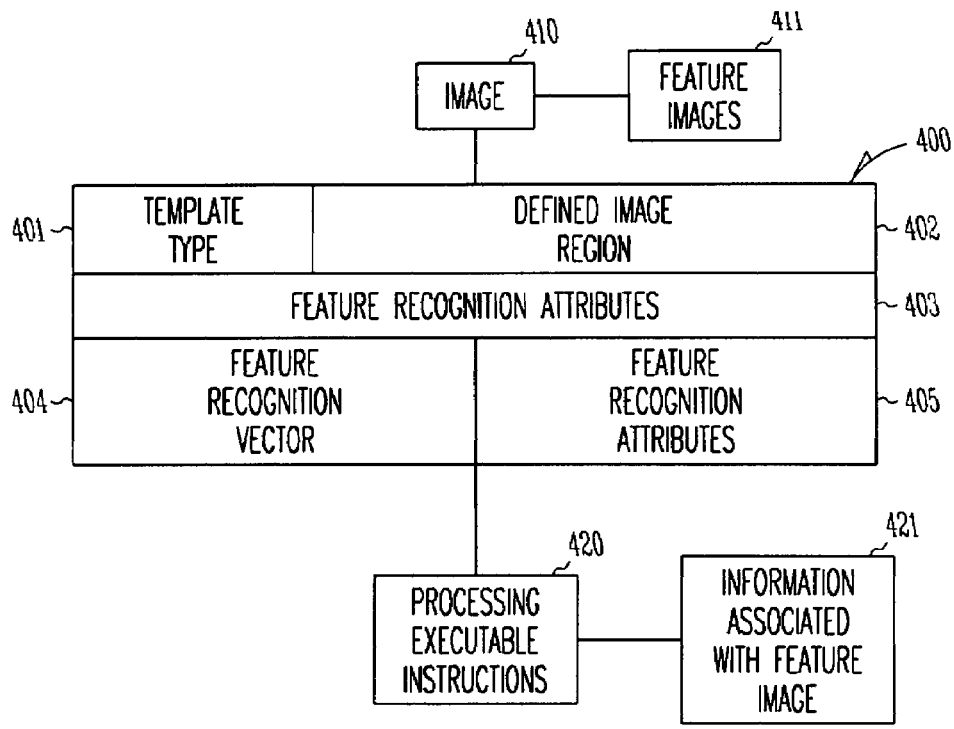
FIG. 4 is a block diagram of a template used to process image data.

FIG. 4 shows one data template 400 used to process image data 410 having one or more feature (e.g., graphical symbols) images 411. As one skilled in the art will readily appreciate, the exact physical configuration of data template 400 is modifiable without departing from the present invention, since any logical association of the data template 400 is intended to fall within the scope of the present invention. Moreover, the exact data structure used to logically associate data template 400 is modifiable without departing from the present invention.

Each data template 400 includes an identifying template type 401 serving as an identification for various data templates 400 having different data values (e.g., defined image regions of interest 402) or configurations. The template type, in some embodiments, can also be defined to a specific/ defined image region of the image 410. As one skilled in the art will appreciate this is an identification of pixel coordinates wherein the template is to be associated, within all the available pixel coordinates of the image 410.

Further, the template 400 includes one or more feature recognition attributes 403. The feature recognition attributes 403 are used to help identify a feature recognition vector 404. The feature recognition attribute 404 is used, in some embodiments, by a processing set of executable instructions 420 and compared to defined region 402 by using the feature recognition attributes 403. In this way, a specific feature image 411 is identified.

Moreover in some embodiments, one or more attribute rules 405 are included within the template 405. The attribute rules are used by the processing set of executable instructions to extract, define, or otherwise associate information 421 from the feature image. For example in some embodiments, the attribute rules 405 are used to map the image feature 411 to a specific raw value or translate the image feature 411 to a specific raw value. As previously presented information 421, in some embodiments, is provided by using a table to map orientations of the isolated feature 411 to a specific value based on the isolated feature's 411 orientation within the defined image region 402, or in other embodiments information 421 is calculated using attribute rules 405, or in still other embodiments the information 421 is extracted by executing an OCR set of executable instructions on the detected feature 411. Further, any association, assignment, conversion, extraction, or translation associated with the identified feature 411 is intended to fall within the scope of the present invention.

In some embodiments, the information 421 defined, associated or extracted from the feature is used to produce an instrument reading associated with the feature 411. The instrument reading, in other embodiments, is dependent upon the orientation of the detected image feature 411 within the defined region 402 of the image 410. In still other embodiments, the information 421 includes numeric characters, symbol characters, any text characters, or a combination thereof. As previously presented, the extracted information, in some embodiments, is achieved by using standard OCR sets of executable instructions.

Figure 5:
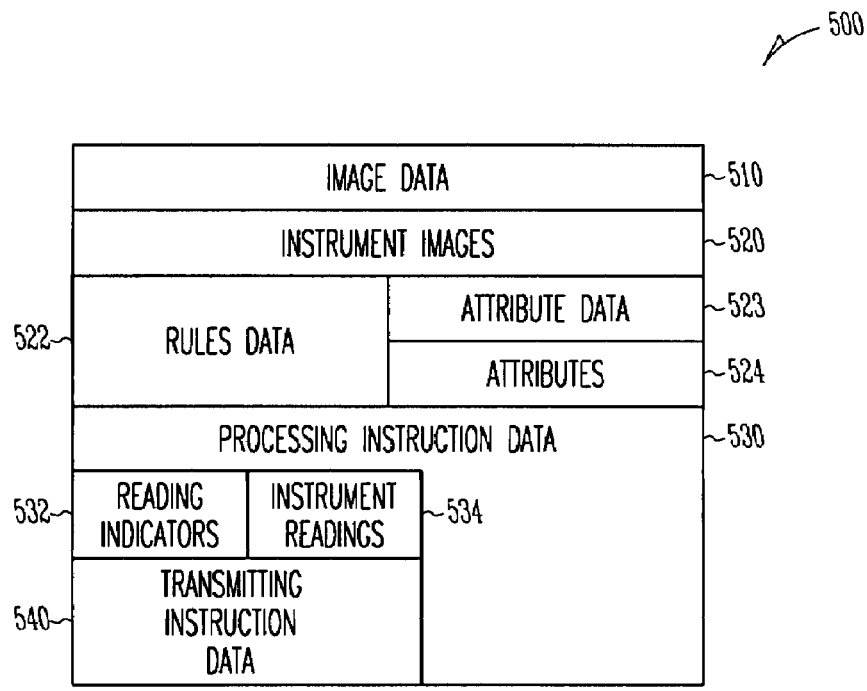
FIG. 5 is a block diagram of functional data used to translate image data.

FIG. 5 shows functional data 500 used to translate image data 510. Again, the functional data 500 need not be physically or contiguously stored, since any logical association of functional data 500 is intended to fall within the scope of the present invention. In some embodiments, the functional data 500 include image data 510 representative of one or more instrument images 520 and rules data 522 uniquely associated with the instrument images 520. The rules data include attribute data 523 associated with attributes 524 of one of the instrument images 520.

Further, the functional data 500 include processing instruction data 530 operable to isolate each instrument image 520 by using the rules data 522 to detect one or more reading indicators 532. The reading indicators 532 are represented within each instrument image 520. Moreover, the processing instruction data 530 are operable to translate the reading indicators 532 into instrument readings 534, suitable for computer readable medium manipulation and processing. For example in some embodiments, the translation to instrument readings 534 renders numeric or text data useful by other instruction data, such as transmitting instruction data 540. Transmitting instruction data 540 transmits one or more of the reading indicators 532 and/or the instrument reading 534. As previously presented, transmission occurs over any suitable channel or combination of channels, such as wireless, infrared, hardwire, telephone, radio frequency, satellite, and the like.

Moreover, as previously presented the attribute data 523 include attributes 524 suitable to permit the rules data 522, when processed by the processing instruction data 530, to uniquely identify reading indicators 532 within the instrument images 520. Again in some embodiments, this is achieved by defining attributes 524, which identify, for example shapes, color, texture, intensity, pattern, scale, gradient, and others associated with the relevant instrument image 520. Further, the attribute data include data operable to permit identified instrument images 520 having a defined orientation within the image data 510 to be mapped or calculated to one or more raw values. The rules data 522, in some embodiments, are executed by the processing instruction data 530 to use the values and generate the appropriate instrument indicators 532 and instrument readings 534.

Figure 6:
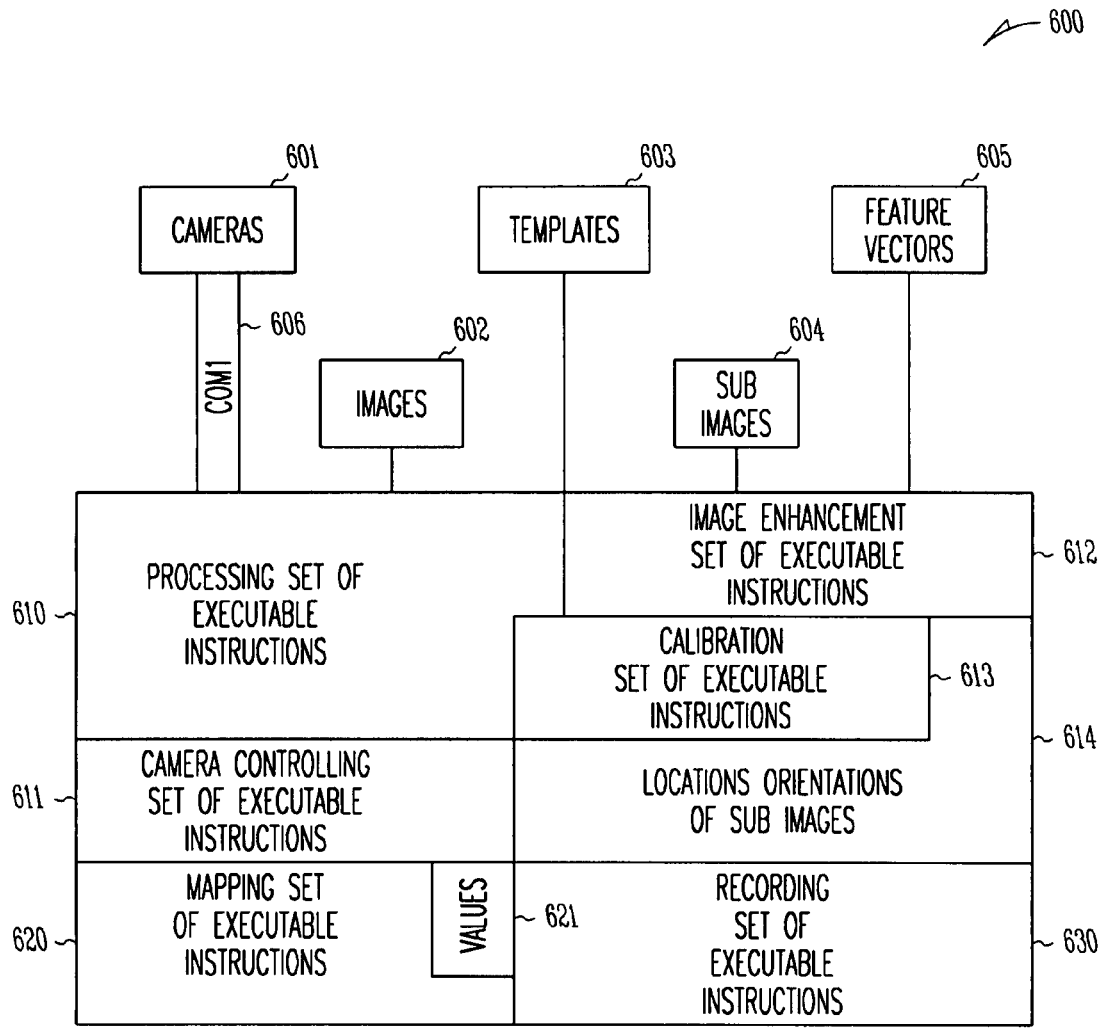
FIG. 6 is a block diagram of a system for capturing and processing images.

FIG. 6 shows one system 600 for capturing and processing images 602. The system 600 includes a camera 601 to capture an image 602, a template 603 uniquely associated with a sub image 604, a feature vector 605 defining a feature (e.g., graphical symbol) within the sub image 604, and a processing set of executable instructions 610. The processing set of executable instructions 610 extracts a location and or orientation 614 of the feature within the sub image by using the template 603 and the feature vector 605.

Also, one or more cameras 601 are used in some embodiments and are operable to communicate with the processing set of executable instructions 610 through communication channel COM1 606. COM1 606 is not limited to a hardwired communication channel, any communication channel including wireless, radio frequency, satellite, telephone, Internet, peer-to-peer, infrared, and the like are intended to fall within the scope of the present invention. Moreover, a controlling set of executable instructions 611 is included to appropriately interface the cameras 601 (e.g., an off-the-shelf device driver set of executable instructions, a customized device driver set of executable instructions, and the others).

In some embodiments, a mapping set of executable instructions 620 maps the location and/or orientation of the sub image 604 within the image 602 to a value 621. The value 621 is numeric data, symbolic data, alpha data, and the like. Further as is appreciated by those skilled in the art, the value 621 need not be a single numeric value 621 or a single character string, as in some embodiments, the value 621 is a range of numeric values 621, or a set of character strings. Further, in other embodiments the value 621 is associated with a reading on an instrument panel of a aircraft, land vehicle, marine vehicle, factory control panel, and others.

Additionally, in still other embodiments a recoding set of executable instructions 630 records the value 621. As previously presented this value 621, in some embodiments, is stored locally or remote, it may be stored in volatile or non-volatile memory, and it may be stored in a distributed fashion across multiple storage media. Also, multiple images 602 or a single image 602 are acquired, with the best quality image 602 selected to be processed by the processing set of executable instructions 610.

In yet another embodiment, an image enhancing set of executable instructions 612 is used to improve the quality of the electronic image 602 before the image is processed by the processing set of executable instructions 610. For example, the image is dithered to improve clarity, or warped to improve processing throughput. Of course, any image enhancement, registration, or warping technique is intended to fall within the scope of the present invention.

Also in some embodiments, a calibration set of executable instructions 613 is provided to initially calibrate the camera(s) 601. As previously presented, any number of calibration techniques are used in the present invention, including the one discussed herein and above where error rates are automatically calculated and used during processing.

Further, searching for locations and/or orientations 614 within the sub images for a feature, need not always begin at 0 degrees and progress to 360 degrees as discussed above, since in some embodiments previously stored sub images 604 are compared to newly taken sub images 604 and a prediction is made as to the location of the desired feature. As one skilled in the art will appreciate, this will improve processing throughput of the processing set of executable instructions 610.

Additionally, in some other embodiments, a feature may be obscured by another feature. For example, a smaller needle image (e.g., feature 1) can be behind a larger needle image (e.g., feature 2) within the sub image 604. In these instances, the processing set of executable instructions 610 draws inferences as to the correct location and orientation 614 of each of the needles (e.g., features 1 and 2), by assuming that the smaller needle image (e.g., feature 1) has not disappeared entirely when only the larger needle (e.g., feature 2) is detected during processing.

Also, in still other embodiments, the image 602 can become obscured by something coming in between the camera's 601 lens and the instrument panel when an image 602 is captured. In this instance, the large discrepancy between any previous recorded images 602 and the newly acquired obscured image 602 are detected by the processing set of executable instructions 610. Once detected, a new image 602 is rapidly taken and if it remains obscured electronic notifications and/or reporting takes place. As one skilled in the art will appreciate, multiple images of the same object is often referred to as frames of the image, in this frames of image 602 are processed.

Figure 7:
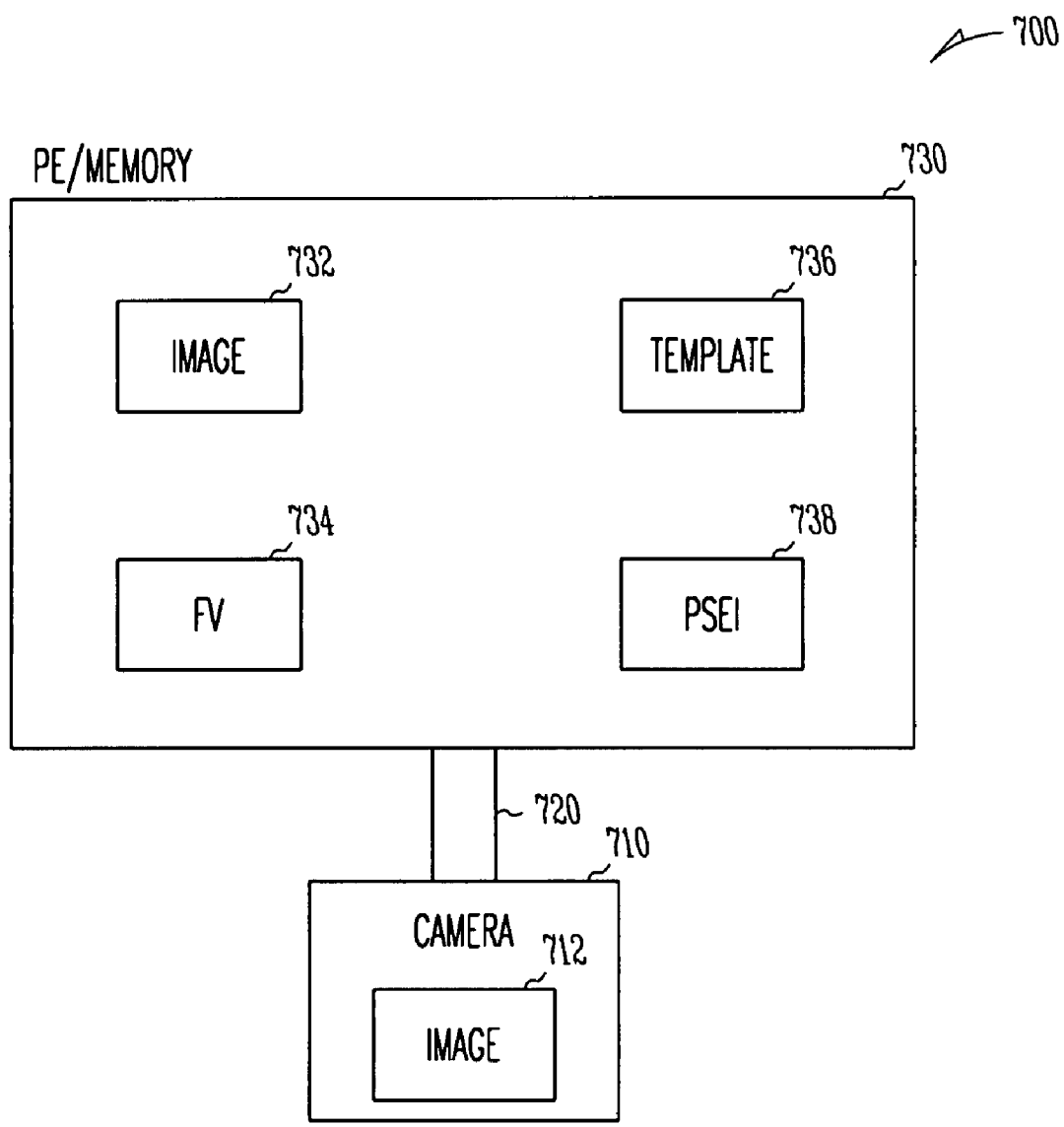
FIG. 7 is a block diagram of another system for capturing and processing images.

FIG. 7 shows another system 700 for processing images according to the teachings of the present invention. The system 700 includes a camera 710, having a captured image 712 and a Processing Element (PE)/Memory device 730 having a copy of image 712, namely image 732, a template 736, a feature vector 734, and a processing set of executable instructions PSEI 738.

The camera 710 interfaces with the PE/Memory device 730 through a communications channel 720. As previously presented, the communications channel can include a variety of channels, such as infrared, wireless, hardwired, Internet, peer-to-peer, radio frequency and the like. Further, the camera 710 includes any device capable of trapping and recording two or three-dimensional pictures of objects into an electronic representation of the objects.

The PE/Memory device 730 includes any device or combination of devices capable of storing or retrieving electronic data from a memory and capable of processing a PSEI 738 using a processing element in cooperation with a memory (e.g., volatile or non-volatile). Captured image 712 is transferred from the camera 710 over communications channel 720 and resides in PE/Memory device 730 as Image 732.

The PSEI 738 acquires a template 736 associated with a sub image within the image 732 and a feature vector FV 734 that defines a feature within the sub image. Further, the PSEI 738 uses the FV 734 and the template 736 to extract or define a location of the feature within the sub image.

CONCLUSION

Feature image translation of the present invention permits the capturing of an image having one or more sub images, each sub image associated with an instrument. Once a captured image is received the sub images are processed from a template, and there is no need to retain the image or any of the sub images in storage or memory. Further, features or graphical symbols within the sub images are detected using the template and efficiently mapped or calculated to a raw value; the values are then combined to form an instrument reading.

As one skilled in the art will readily appreciate, the present invention readily permits the automation of devices having instruments or indicators to capture, record, and share instrument readings in an automated environment without undue upgrade or expense. Moreover, existing automated devices are augmented by the present invention to provide for backup instrument reading, recording, and quality verification of any existing instrument reading and recordation. Further, existing marine vehicles, land vehicles, utility meters, factory devices, and other devices having instrument panels, which require processing by humans to obtain accurate readings, would benefit from techniques that translate the instruments' readings, which are indirectly present in one or more instrument values as image data, into a computer readable format. Once an instrument's reading is in a computer readable format, a variety of beneficial options become available to improve the performance or quality associated with the devices to which the instrument's reading is related. For example, acquiring, recording, and optionally transmitting an instrument's reading for a device, in a computer readable medium, permits automated detection and reporting of potential device malfunctions. The captured readings can also be used to cross check digital readings providing a quality backup, in the event of digital reading failures or provide a check for any human processing the readings. The present invention also eliminates the need to store or transmit enormous video stream data.

What is claimed is:

1. A method of processing an image, comprising:
   using a computer to carry out the method of identifying one or more sub images which are associated with an image of one or more instrument panels of one or more devices;
   identifying values represented by one or more located features within each sub image by using one or more templates, wherein each template includes one or more rules to assist in identifying the values and each template associated with a feature vector and the feature vector representing a shape of a particular sub image and coverage area of the particular sub image and angular position of the particular sub image within the image, and wherein each feature vector is represented as a collection of three pixel coordinates; and
   using the values to generate one or more readings for one or more of the instrument panels of one or more of the devices, wherein the values are used to determine locations of the features within each of the sub images, each location for each feature is then calculated using an initial calibration coordinate points and the angular position to resolve the one or more readings.

2. The method of claim 1, wherein identifying values further includes representing the three pixel coordinates as a first pixel coordinate for a center of a particular sub image to which it relates, a second pixel coordinate for an edge coordinate along an x-axis extending eastward or westward from the center, and a third pixel coordinate for a different edge coordinate along a y-axis extending northward or southward from the center.

3. The method of claim 1 further comprising, deriving the shapes of each particular sub image from the corresponding three pixel coordinates associated with each feature vector.

4. The method of claim 1, wherein identifying the one or more sub images further includes capturing the one or more sub images as pictures taken from the instrument panels that are included in one or more of the following: an aircraft, a marine vehicle, and a land vehicle.

5. The method of claim 1, wherein using further includes generating the one or more readings by performing calculations on the values in response to each sub image's feature vector.

6. The method of claim 1, wherein identifying the one or more sub images further includes using a camera to periodically take digital pictures of the instrument panel to capture the one or more sub images.

7. The method of claim 1 further comprising, reporting the one or more readings to control the one or more devices.

8. The method of claim 1 further comprising, storing the one or more readings in a data store that is subsequently mined to produce historical trends.

9. A machine-implemented system for capturing and processing images, comprising:
   a camera to capture an image within a machine-readable medium;
   a template embodied in a machine-readable medium that is uniquely associated with a sub image of the image;
   a feature vector embodied in a machine-readable medium for defining a feature within the sub image, wherein the feature vector identifies three coordinate points within the sub image for the feature of the sub image and the sub image representing a graphical symbol, and a shape for the graphical symbol also reflected in the feature vector along with its coverage area attributes within the image, and wherein a first pixel coordinate defines a center of the sub image, a second pixel coordinate defines an eastward or westward extension of the feature from the center of the sub image, and a third pixel coordinate defines a northward or southward extension of the feature from the center of the sub image; and
   a processing set of executable instructions to process on a machine and to extract a location of the feature within the sub image by using the template and the feature vector, and wherein the template includes one or more rules for the feature, and wherein the location is used along with initial calibration coordinates and a calculated angular orientation to generate a reading for the feature.

10. The system of claim 9 further comprising, a mapping set of executable instructions to process on the machine and to map the location to a value.

11. The system of claim 10 wherein the value is associated with the reading on an instrument panel.

12. The system of claim 11 further comprising, a recording set of executable instructions to process on the machine and to record the value.

13. The system of claim 9 further comprising, a camera controlling set of executable instructions to process on the machine and to capture one or more additional images at configurable periods.

14. The system of claim 9 further comprising, one or more additional cameras capturing one or more additional images.

15. The system of claim 9 further comprising, an image enhancing set of executable instructions to process on the machine and to enhance a quality associated with the image before the image is processed by the processing set of executable instructions on the machine.

16. The system of claim 9 further comprising, a calibration set of executable instructions to process on the machine and to calibrate the captured image.

17. A machine-implemented system for capturing and processing images, comprising:

an image capturing device that processes on a machine and that records a picture of an image in a machine-readable format accessible to the machine; and instructions that process on the machine that uses the image and a feature vector associated with the image to produce a reading for an instrument panel associated with the image, wherein the feature vector defines a feature of the reading via three pixel coordinates, one pixel coordinate defines a center for the instrument panel, a second pixel coordinate defines an eastward or westward extension of the feature, and a third pixel coordinate defines a northward or southward extension of the feature, and wherein the feature via the feature vector has its location resolved within the image via a template and after the location is known, initial calibration coordinate points and a calculated angular orientation are used to determine the reading.

18. The system of claim 17, wherein the instructions periodically interact with the image capturing device at configurable intervals to capture new images of the instrument panel to produce new readings.

19. The system of claim 17, wherein the instructions automatically report the reading to other instructions for subsequent automated processing in response to the reading.

20. The system of claim 17, wherein the instructions use the template in connection with the feature vector to derive the location of the feature within the image.

* * * * *